Sept. 20, 1960  
J. COOK  
2,953,085  
APPARATUS FOR AND METHOD OF MARKING CONTINUOUS STOCK IN MOTION  
Filed Sept. 7, 1955  
4 Sheets-Sheet 1
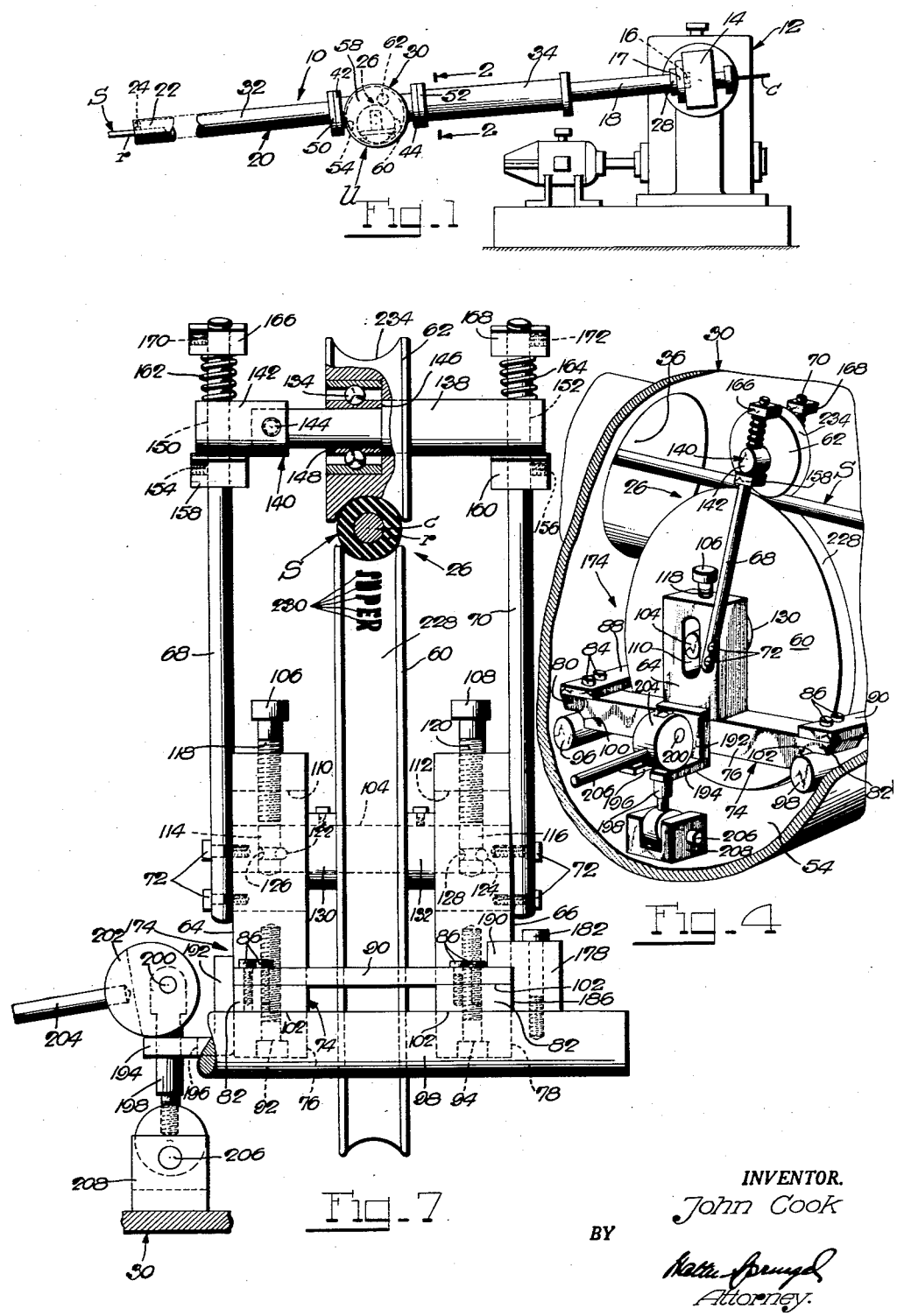
INVENTOR.  
John Cook  
BY  
*Attorney.*

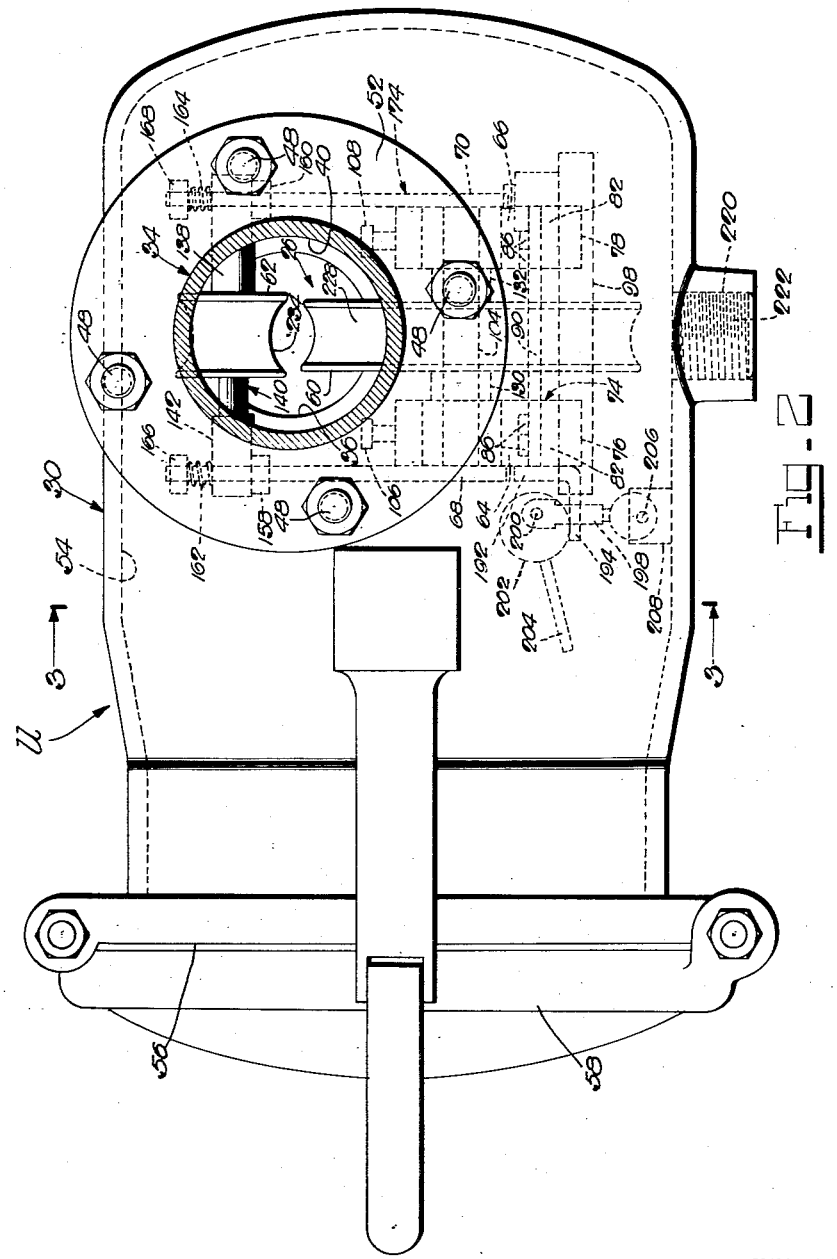

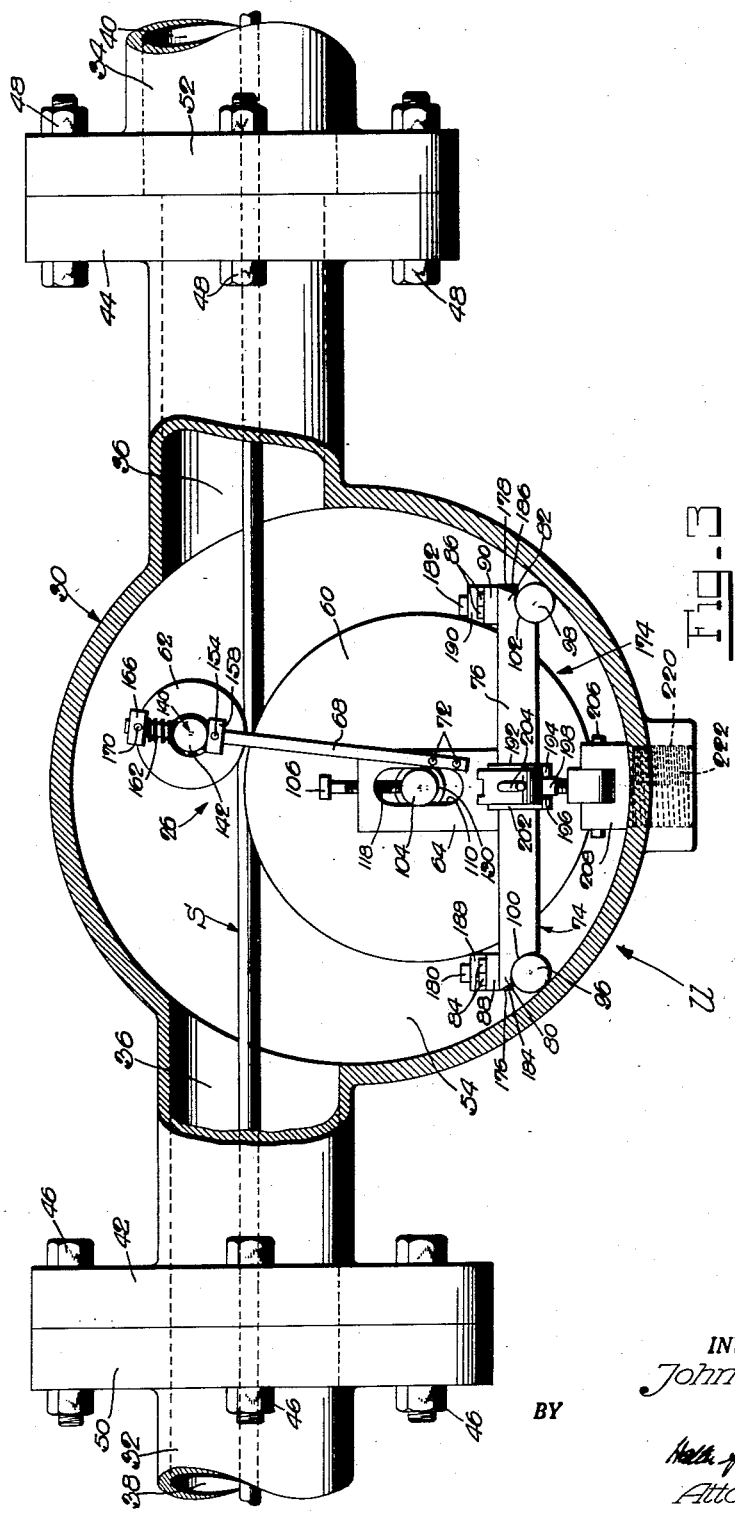

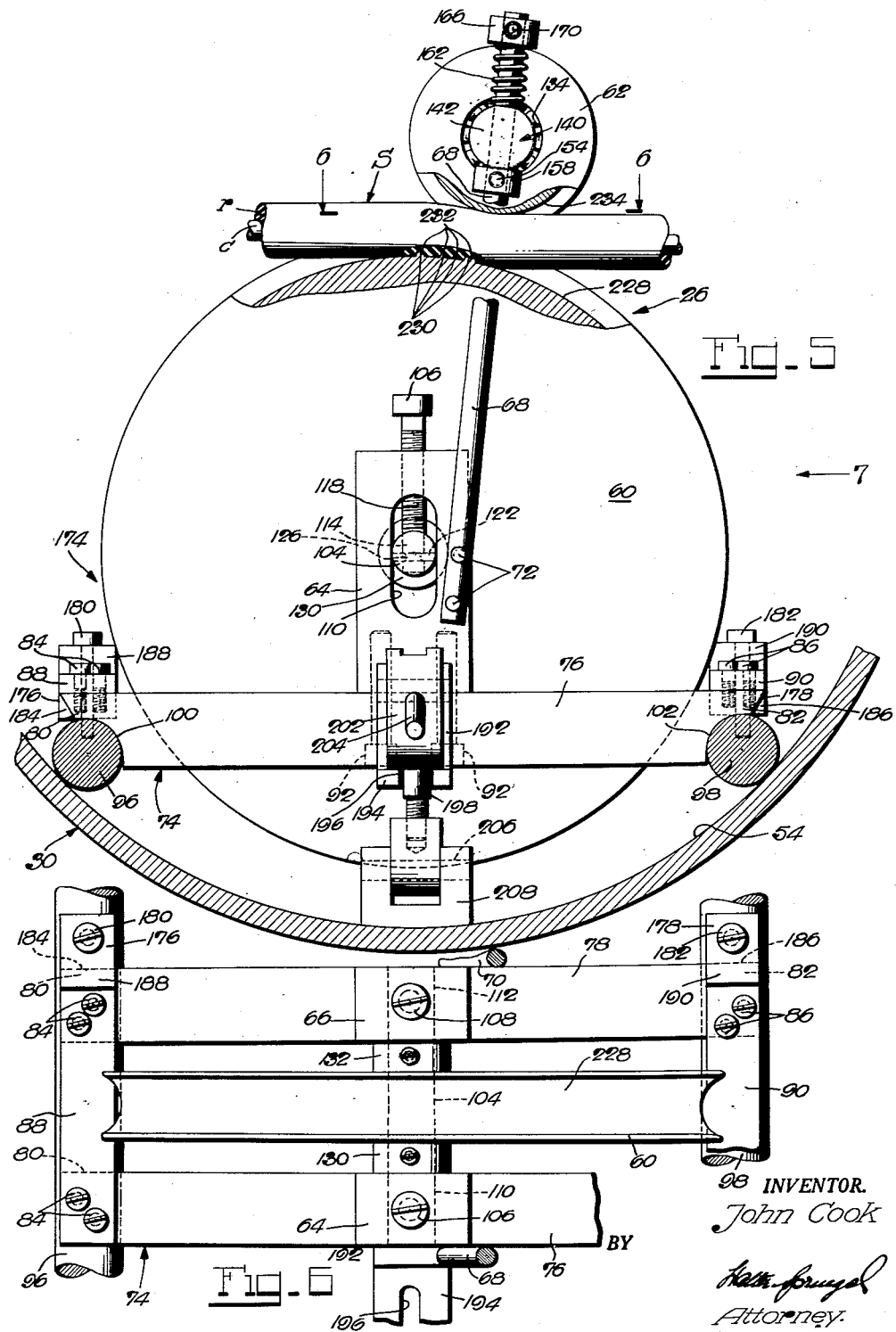

United States Patent Office 2,953,085
Patented Sept. 20, 1960

2,953,085

APPARATUS FOR AND METHOD OF MARKING CONTINUOUS STOCK IN MOTION

John Cook, Ridgewood, N.J., assignor to The Standard Machinery Company, Mystic, Conn., a corporation of Connecticut Filed Sept. 7, 1955, Ser. No. 532,946

9 Claims. (Cl. 101—6)

This invention relates to the marking in a continuous operation of extruded stock in general, and to apparatus for and methods of marking continuously fed rubber-coated stock in particular.

In order to mark in a continuous operation extruded stock, and especially rubber-coated rod-like stock, such as electric cable, for instance, hereinafter referred to simply as "stock," it is the general practice to pass the same between marking rolls of which one roll, called "operating" roll, carries on its periphery the mark or marks to be impressed in or embossed on the stock, while the other or "counter" roll forces the stock into contact with the periphery of the operating roll with sufficient force to take the mark or marks. However, while this practice is satisfactory in some respects, it is seriously deficient in other respects. Thus, these marking rolls are customarily disposed with their axes lying in a common plane normal to the stock to be marked, so that the length of bite of the rolls on the passing stock, and hence the length of stock in effective marking relation with the operating roll at any instant, is exceedingly short in any event. As a result, there is hardly any pause between the abrupt displacement by the marks on the operating roll of the adjacent stock material and their equally abrupt retraction from the latter, so that the marks formed in or on the stock are frequently imperfect, especially when the stock passes between the rolls at higher speeds, or when the stock varies even slightly in its cross-sectional dimension as it does so frequently. In order that the imperfection of the marks in or on the stock be no more than is unavoidable under these circumstances, the marking rolls are customarily made to grip the stock therebetween with a force which exceeds that required for normal marking of the same, with the result that the stock may become marred by these rolls, especially since the extruded material is still in a relatively soft or wieldy state when subjected to the operating roll.

In thus marking stock, and especially rubber-coated core stock, such as an electric cable, as it continuously emerges from an extruder head and passes into and through a vulcanizer, it is the further general practice to pass the stock through an initial vulcanizer section, then between marking rolls externally of the vulcanizer, and finally into a succeeding main vulcanizer section, the rubber stock being in the initial vulcanizer section sufficiently cured so that its outer skin to be marked is no longer too tacky for marking. This practice involves not only a costly division of the vulcanizer into separate sections and duplication of its servicing equipment generally, but also the specific provision of exit and inlet seals in the initial and main vulcanizer sections next to the external marking rolls. These exit and inlet seals are highly objectionable insofar as their effect upon the stock is concerned. Thus, in order that these seals may be effective, they must have substantial frictional engagement with the stock. Yet, even minimum permissible frictional engagement of these seals with the rubber stock is inducive to marring the latter, this by virtue of the location of these seals in a region of the effective over-all length of the vulcanizer wherein the rubber stock is cured only partly and to a slight depth only.

It is an object of the present invention to provide for the marking, in a continuous operation, of extruded stock, and especially rubber-coated core stock, with marking rolls, without incurring any of the aforementioned deficiencies even at high travel speed of the stock between these rolls and even if the stock should have slight variation in its cross-sectional dimension.

It is another object of the present invention to provide for marking the stock, with marking rolls, so that the marks in or on the stock are to all practical intents and purposes perfect in their execution, and are in any event far less imperfect than those obtained on passing the stock at the higher speeds between marking rolls heretofore.

It is a further object of the present invention to provide for marking the stock, with marking rolls, so that the marks in or on the stock are perfectly legible and otherwise satisfactory when passing the stock between the rolls at exceedingly high speed at which the marks obtained heretofore in or on the same kind of stock would at least in part be so imperfect as to be unacceptable to the trade.

Another object of the present invention is to provide for marking the stock, with marking rolls, so that the marks in or on the stock are to all practical intents and purposes perfect in execution even when the stock travels at high speed between the rolls or has slight variations in its cross-sectional dimension, or both, yet the specific contact-pressure between the stock and rolls need only be a fraction of that required heretofore, thereby eliminating marring of the stock by these rolls in any event.

A further object of the present invention is to provide for marking the stock, with marking rolls, so that the stock is at any instant in full pressure-contact with a substantial arcuate length of the periphery of the operating roll which is at least several times larger than that of the same size roll fully contacted at any instant by the stock heretofore, thereby to obtain between the displacement by the marks on the operating roll of the adjacent stock and their subsequent retraction therefrom a definite intervening pause in time during which the marks on the roll remain in intimate contact with the displaced stock and, in consequence, contribute greatly in achieving the aforementioned perfection, or at least near perfection, of the marks in or on the stock even at high travel speed of the latter between the rolls.

Another object of the present invention is to devise a method according to which stock is marked with an operating roll, by guiding the stock against the latter so that the marks in or on the stock are perfect, or nearly perfect, as aforementioned, at any travel speed of the stock and even if the latter should have slight variations in its cross-sectional dimension.

It is a further object of the present invention to provide for the continuous marking of rubber-coated core stock as it emerges from an extruder head and passes through a vulcanizer, by arranging the marking rolls internally in the vulcanizer, thereby not only obviating any costly division of the latter into separate sections and external interposition of the marking rolls therebetween, and also eliminating the heretofore imperative seals in the vulcanizer sections next to the external marking rolls and their objectionable tendency to mar the stock, but also achieving optimum stock-marking performance of these rolls by virtue of their being heated to the approximate temperature of the usual steam in the vulcanizer.

Another object of the present invention is to provide for ready relative adjustment of the marking rolls in the vulcanizer for the marking of different size stock passing through the latter, and to this end also provide for ready access to the marking rolls in the vulcanizer and sufficient space therein to make the adjustment with ease and dispatch.

A further object of the present invention is to arrange the marking rolls in a separate casing which is interposed in the vulcanizer and forms a part thereof, the casing being provided with a trap door which, when closed, seals the casing against the escape of steam or any other curing agent from the vulcanizer and, when opened, provides for ready access to the marking rolls for adjustment or other purposes, thereby permitting the provision of adequate space in the casing for mounting the marking rolls and for conveniently adjusting them from the outside, without requiring any departure from the accustomed form and size of the vulcanizer proper other than simple interposition of the casing therein.

Another object of the present invention is to provide a separate support for the marking rolls with which they are adjustably assembled in a single unit that may removably be mounted in the aforementioned casing and readily removed therefrom for inspection, repair, replacement or other purposes.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a fragmentary side view of a vulcanizer installation including a stock-marking section or part in accordance with one aspect of the present invention;

Fig. 2 is an enlarged section through the vulcanizer installation as taken on the line 2—2 of Fig. 1;

Fig. 3 is a section through the stock-marking part of the vulcanizer installation as taken on the line 3—3 of Fig. 2;

Fig. 4 is a fragmentary perspective view, partly in section, of the stock-marking part of the vulcanizer installation including a stock-marking device embodying another aspect of the present invention;

Fig. 5 is an enlarged side-elevational view, partly in section, of the stock-marking device;

Fig. 6 is a section taken on the line 6—6 of Fig. 5; and

Fig. 7 is an end-elevational view, partly in section, of the stock-marking device as seen in the direction of the arrow 7 in Fig. 5.

Referring now to the drawings and more particularly to Fig. 1 thereof, the reference numeral 10 designates a vulcanizer installation which, in the present instance, is operatively associated with an extruder 12 having a conventional side-delivery head 14 for the longitudinal passage therethrough of a continuous core c, such as a bare electric conductor, for instance, which is to be coated with extruded rubber r on its passage through an extrusion die 16 in the head 14 to form an insulated conductor s, hereinafter simply referred to as "stock."

On its emergence from the die 16 in the extruder head 14 the continuous stock passes directly into and through the vulcanizer installation 10 for the vulcanization of its extruded rubber coat by a suitable agent, in this instance, steam under pressure. To this end, the vulcanizer installation 10 is directly connected to the extruder head 14, preferably by a flange 17 on a conventional splice box 18 which on disconnection of its flange from the extruder head may be slid into the vulcanizer installation for ready access to the die end of the extruder head whenever necessary. The vulcanizer installation 10 may be conventional, providing a longitudinal conduit 20 having spaced passages (not shown) for the inlet of steam under pressure and the discharge of steam and/or condensate, respectively, and being suitably sealed against the escape of steam therefrom. To this end, the delivery end 22 of the vulcanizer installation is provided with a conventional seal 24 through which the stock passes in sealing relation therewith to prevent the escape of steam thereat, while the opposite end of the installation is primarily sealed by the extruder head 14 by virtue of the attachment of the splice box 18 thereto, steam being further prevented from escaping through the die aperture 16 by virtue of the continuous passage therethrough of the core stock c and rubber extruded thereon.

In accordance with one aspect of the present invention, provisions are made to mark the stock interiorly of the vulcanizer installation as the same is conventionally drawn therethrough by power-driven reeling mechanism (not shown). To this end, a roll-type stock-marking device 26 is arranged in the vulcanizer installation 10, preferably at such a distance from the entry end 28 thereof that the extruded rubber coating on the core stock has on its passage within the installation to the marking device been sufficiently vulcanized, at least on its periphery, to take a satisfactory impression of a mark by local displacement of the rubber under pressure from the mark.

Preferably, and as shown in Figs. 1 and 3, the roll-type marking device 26 is provided in a casing 30 which is interposed between longitudinal sections 32 and 34 of the vulcanizer installation and forms a part of the latter in the performance of its designated vulcanizing function. The casing 30 has a longitudinal passage 36 which is in the interposition of the former between the vulcanizer sections 32 and 34 is aligned and continuous with the steam chambers 38 and 40 in the latter (Fig. 3). In the present instance, the casing 30 is provided with end flanges 42 and 44 by means of which it is releasably bolted at 46 and 48 to adjacent end flanges 50 and 52 on the vulcanizer sections 32 and 34, respectively. The casing 30 is also provided with a chamber 54 which, in the present instance, is generally cylindrical and extends at right angles to the longitudinal axis of the passage 36 and also intersects the latter (Figs. 3 and 2). Mounted in the chamber 54 of the casing is the aforementioned marking device 26, and the latter is accessible from the outside of the casing 30 through the open end 56 of the chamber 54 (Fig. 2) which is normally sealed by a conventional hinged trap or cover 58 on the casing that may be opened.

The marking device 26 comprises, in the present instance, a marking roll 60 and a counter roll 62 of which roll 60 is carried by spaced support brackets 64 and 66 and roll 62 is carried by bars 68 and 70 which are secured at 72 to the support bracket 64 and 66, respectively, and extend therefrom (Figs. 3, 4, 5 and 7). The support brackets 64 and 66 are mounted on a base frame 74 which, in the present instance, is articulated, and comprises spaced opposite rails 76 and 78 to the adjacent ends 80 and 82 of which are bolted at 84 and 86 overlying bars 88 and 90, respectively, which serve to space the rails 76 and 78 from each other and complete the base frame 74. The support brackets 64 and 66 are conveniently bolted at 92 and 94 to the rails 76 and 78, respectively, of the base frame 74 (Figs. 5 and 7). The base frame 74 is located and slidable on fixed tracks 96 and 98 in the chamber 54 of the casing 30, and the adjacent ends 80 and 82 of the rails 76 and 78 of the base frame are to this end partially fitted at 100 and 102 to the tracks 96 and 98, respectively (Figs. 3, 4, 5 and 7).

The marking roll 60 is, in the present instance, freely turnable on a shaft 104 which is, in turn, non-rotatably carried by the support brackets 64 and 66 through intermediation of adjustment screws 106 and 108 (Figs. 5 and 7). More particularly, the opposite ends of the shaft 104 extend into elongated slots 110 and 112 in the support brackets 64 and 66 and turnably receive blank end lengths 114 and 116 of the threaded shanks 118 and 120 of the adjustment screws 106 and 108, respectively, which are threadedly received in the support brackets 64 and 66 (Figs. 5 and 7), the ends of the shaft 104 being provided with cross pins 122 and 124 which project into peripheral grooves 126 and 128 in the blank end lengths 114 and 116 of the screw shanks 118 and 120, respectively, in order to retain the shaft ends on the latter and on rotation of the screws 106 and 108 cause adjustment of the shaft 104 and of the marking wheel 60 thereon in the direction of the slots 110 and 112, i.e., toward and away from the passage 36 in the casing 30 (Figs. 3 and 4). Axial movement of the marking wheel 60 on its shaft 104 is prevented by spacers 130 and 132 which are interposed between the wheel 60 and the support brackets 64 and 66, respectively.

The counter roll 62 is through intermediation of an antifriction bearing 134 journalled in this instance on a section 138 of a split shaft 140 the other section 142 of which is releasably connected at 144 with the section 138 (Fig. 7), the split shaft providing between its ends of uniform diameter an integral annular shoulder 146 against which the press-fitted inner face 148 of the bearing 134 may be driven for convenient alignment of the counter roll 62 with the marking roll 60 in the assembly of the marking device. The opposite ends of the split shaft 140, which are of uniform and relatively large diameter, are provided with cross bores 150 and 152 through which the preferably round bars 68 and 70, respectively, extend with a sliding fit. Thus, the split shaft 140 is held non-rotatable on the bars 68 and 70 which guide the former and the rotatable counter roll 62 thereon for movement toward and away from the longitudinal axis of the passage 36 in the casing 30 (Figs. 3 and 4). Adjustable on the guide bars 68 and 70 (Fig. 7) by means of set screws 154 and 156 are stop collars 158 and 160, respectively, against which the opposite ends of the split shaft 140 are urged by compression springs 162 and 164 that are held under compression by collars 166 and 168 on the guide bars 68 and 70, respectively. The collars 166 and 168 are also adjustable on the guide bars 68 and 70 by set screws 170 and 172, respectively, so that the compression of the springs 162 and 164 against the split shaft 140 may be varied in any adjusted position of the latter on the stop collars 158 and 160.

The base frame 74, support brackets 64 and 66, guide bars 68, 70 and rolls 60 and 62 form a sub-unit 174 which is releasably mounted in the casing 30. To this end, the sub-unit 174 is located on and releasably clamped to the aforementioned tracks 96 and 98 (Figs. 3 to 7) which may conveniently be in the form of round bars suitably secured, as by welding or bolting, to the inner wall of the chamber 54 in spaced parallel relation to each other. The tracks 96 and 98 are, in the present instance, in line with the open end 56 of the chamber 54 (Figs. 2, 3 and 4) so that the unit 174 may with its base frame 74 be moved on these tracks toward and away from the open chamber end 56 which is sufficiently large to permit the passage of the unit 174 therethrough into and from the casing 30 when the latter is interposed between the vulcanizer sections 32 and 34 (Fig. 1). The tracks 96 and 98 are, furthermore, so arranged that the unit 174 need merely be moved thereon in order to bring the same into its operative position with respect to stock S being drawn through the passage 36 in the casing 30 (Figs. 4 and 7). To facilitate the location of the unit 174 in its operative position, there are provided stop members 176 and 178 which may be bolted at 180 and 182 to the tracks 96 and 98, respectively. Thus, in order to locate the unit 174 in its operative position in the chamber 54, the same need merely be moved inwardly on the tracks 96 and 98 until the rear rail 78 and overlying ends of the spacer bars 88 and 90 of this unit abut the surfaces 184 and 186 of the stop members 176 and 178, respectively (Figs. 6 and 7). The stop members 176 and 178 are advantageously formed with forwardly projecting lugs 188 and 190 which in the operative position of the unit 174 overlap the rear rail 78 and overlying ends of the spacer bars 88 and 90, respectively, of the base frame 74 and thus retain the rear end of the unit 174 on the tracks 96 and 98.

The front end of the unit 174 is in its operative position releasably clamped to the tracks 96 and 98. To this end, the front rail 76 of this unit carries a short angle 192 (Figs. 4 and 7) the forwardly extending leg 194 of which is slotted at 196 to provide clearance for an arm 198 pivotally carrying at 200 a cam 202 having an operating handle 204. In the present instance, the cam 202 is a disc eccentrically pivoted at 200 on the arm 198 which, in turn, is pivoted at 206 in a bracket 208 suitably mounted in the chamber 54. When the unit 174 is in its operative position and the arm 198 swung into the slot 196 in the angle 192 (Fig. 7), the unit may at its forward end be forcefully clamped to the tracks 96 and 98 on merely turning the cam 202 at its handle 204 counterclockwise into wedging engagement with the angle leg 194. Conversely, the unit 174 may be released from clamping engagement with the tracks 96 and 98 on merely turning the cam 202 in the opposite direction, whereupon the arm 198 with the cam thereon may be swung against the adjacent inner wall of the chamber 54 in order to leave sufficient space in the latter for the removal of the entire unit therefrom through the open end 56 thereof (Figs. 2 and 4).

While the casing 30 with its marking device 26 is, in the present example, interposed in a vulcanizer installation which is substantially horizontal (Fig. 1), the same may, of course, be interposed in a vertical vulcanizer installation with equal advantage. Thus, the interposition of the casing 30 with its marking device in a vulcanizer installation as an intermediary unit U of the latter is in any event advantageous in that the stock will not only be marked most efficiently while undergoing vulcanization and being at the right degree of partial vulcanization at which the same will best take the marking, be it impressed therein or embossed thereon, with the least pressure from the marking rolls, but the stock will thus be marked without requiring the heretofore imperative and costly division of the vulcanizer installation into separate sections for interposition therebetween in exposed fashion of the marking rolls, including the heretofore required seals at the ends of the vulcanizer sections next to the exposed marking rolls which are so objectionable due to their tendency of marring the partly vulcanized stock. The present intermediary unit U of the vulcanizer installation, by its incorporation of the marking device 26 and by its further provision for continuance of the steam chamber throughout the extent of the installation, not only serves to mark the stock, but also participates in the performance of the installation of its vulcanizing function and by virtue thereof requires no departure of the vulcanizer from its conventional form and size other than simple interposition of the intermediary unit U therein. Thus, the instant intermediary unit U even lends itself to ready interposition in an existing conventional vulcanizer installation by merely removing a length thereof by cutting, for instance, and simply mounting flanges on the cut ends of the remaining installation for facile assembly of the intermediary unit with the latter. The intermediary unit U is further advantageous in any event, in that it not only provides for ready removal of the marking device 26, in its form as the sub-unit 174, from the casing 30 and its equally ready reintroduction therein through the open end of the chamber 54, but also provides for most facile and quick location of the same in its operative position in the casing and for its equally facile and quick releasable securement in operative position in the casing. The intermediary unit U is still further advantageous in any event, in that the open end of the chamber 54 and the latter itself are sufficiently spacious not only comfortably to gain access to the rolls 60 and 62 for passing the leading end of new stock between the latter and, if necessary, relieve the pressure of the counter roll 62 from the new stock until the latter is threaded through the vulcanizer installation, but also comfortably to undertake relative adjustment of the rolls 60 and 62 in the casing for marking stock of varying cross-sectional dimensions, while even permitting ready visual observation of any of these operations from the outside of the casing. Moreover, when the intermediary unit U is interposed in a substantially horizontal vulcanizer installation, as in Fig. 1, the casing 30 is so disposed that the greater part of the chamber 54 therein, which in the exemplary form shown is axially displaced from the passage 36 (Figs. 2, 3 and 4), is below the latter and forms a sump for accumulating condensate which may occasionally be drained therefrom through a bottom passage 220 in the casing. The drain passage 220 may normally be sealed by any suitable means, as by a removable plug 222, for instance.

The marking roll 60 is on its peripheral surface 228 provided with at least one mark 230 of one or more characters (Figs. 5 and 7) which, in the present instance, are raised on the peripheral roll surface 228 so as to imprint the rubber coating r of the passing stock S as at 232 by penetrating, and hence locally displacing, the same thereat, while the counter roll 62 serves to cause the passing stock S to contact the peripheral surface of the marking roll sufficiently intimately to receive the mark 232 at recurrent intervals. Since the stock to be imprinted is usually round, as in the present instance, the peripheral surface 228 of the marking roll 60 is preferably cross-sectionally concave so that the stock will not only be forced into the deepest center portion thereof on which the mark 230 is provided, but will fit this concave surface over a substantial width thereof in order fully to take a mark of substantial height (Fig. 7). Preferably also, the peripheral surface 234 of the counter roll 62 is cross-sectionally concave in order to approximate the peripheral curvature of the stock and distribute its pressure thereon over a substantial width thereof.

In accordance with another aspect of the present invention, the counter roll 62 functions in the first place to deflect the stock S relative to the marking roll 60 so as to compel the stock to contact the peripheral surface 228 of the latter over an arcuate length thereof which is sufficient to impart its curvature to a readily sensible length of the stock at any instant regardless of the rate of travel of the stock, thereby achieving between the abrupt penetration of the mark on the roll into the stock and the equally abrupt retraction of the same therefrom an intervening pause in time during which the mark remains embedded in the stock and which in any event is of sufficient duration to permit local displacement of the stock into such full and uniform contact with the mark throughout as is required for perfection of the imprinted mark. Since satisfactory marking of the stock further requires a certain contact-pressure between the latter and the mark on the roll, the counter roll 62 further functions to set up the requisite contact pressure in the stock while at the same time performing its aforementioned stock-deflecting function. To these ends, the counter roll 62 is so arranged that its acts on the stock to compel the aforementioned length thereof in contact with the periphery of the marking roll to be resiliently flexed thereagainst with a force which far transcends that induced by the longitudinal tension in the stock. Thus, it is by no means contemplated merely to deflect the stock by means of the counter roll so that the stock is compelled to pass over an appreciable arcuate length of the periphery of the marking roll, and to rely fully on that contact-pressure between the marking roll and the stock which may be induced in the latter by longitudinal tension therein, for instance, for such contact-pressure would in many applications be wholly inadequate for satisfactorily marking the stock under its normal tension when customarily drawn through a vulcanizer by power-driven reeling mechanism.

With the foregoing in mind, the counter roll 62 is, first of all, offset from a plane in which the rotary axis of the marking roll 60 lies and which extends at right angles to the normal substantially rectilinear path of the stock. This is imperative in order that the counter roll 62 may perform one of its described dual functions, namely, that of deflecting the stock from its normal longitudinal path. Further, while thus offset from the plane just described, the counter roll must nevertheless be sufficiently close thereto to compel the stock length in contact with an arcuate length of the periphery of the marking roll to flex thereagainst against quite considerable internal resistance of the stock to such flexure, for it is the force required for such flexure of the stock which is primary relied on for satisfactory contact-pressure of the stock on the marking roll.

The specific contact-pressure, i.e., per unit area, between the stock and marking roll which is theoretically satisfactory for marking perfectly dimensioned stock of uniform consistency is in any event less than that customarily applied to stock by conventionally arranged rolls whose axes lie in a plane normal to the stock path, because excess pressure is relied on to minimize the defects of the marks in the stock which are occasioned by the all-too-brief contact between the latter and the mark on the operating roll in the exceedingly short length of bite of these rolls on the stock, and also by variations in the cross-sectional dimension of the stock. Due to the described offset arrangement of the instant rolls 60 and 62 and the resulting contact of the stock with a substantial arcuate length of the periphery of the marking roll, the specific contact-pressure between stock and marking roll may be considerably less than heretofore and may well approach the above-described theoretical specific pressure. This is due to the fact that the contact between the stock and the mark on the operating roll is in any event of sufficient duration to permit perfection, or at least near perfection, of the imprinted mark in the stock, as explained, especially since the mark on the operating roll is heated to the approximate temperature of the steam in the vulcanizer in which the exemplary marking device is arranged and, hence, has an optimum mark-forming effect on the stock. Also, the forced contact of the stock at any instant with the periphery of the marking roll over a substantially arcuate length thereof makes for uniform formation of the marks in the stock despite variations in the cross-sectional dimension of the latter. It follows, therefore, that in the present offset arrangement of the rolls there is no need for exerting specific pressure on the stock in excess of the abovementioned theoretical specific pressure, wherefore the pressure-characteristics of the present rolls may be such that the latter have no tendency whatever to mar the stock.

It follows from the preceding that the present offset arrangement of the rolls 60 and 62 is highly advantageous in that it makes for perfection of the imprinted marks in or on the stock at any and even exceptionally high rates of travel of the same and even despite variations in its cross-sectional dimension. While this applies to the marking of rubber-coated core stock in the process of its vulcanization, as shown and described, it applies equally to the marking of other continuous stock without any operational association with a vlucanizer, as long as the stock offers some tangible resistance, preferably resilient resistance, to flexure and is locally displaceable by a mark on a roll on contact-pressure therewith induced primarily by its laterally forced flexure thereagainst. Accordingly, the marking device 26 has also utility quite apart from its exemplary association with a vulcanizer and, hence, preferential incorporation in the sealed casing 30, the marking device merely requiring for its satisfactory performance provisions other than the rolls for defining a longitudinal path for the stock from which the latter may be deflected by the counter roll, or for that matter by both rolls jointly, and these provisions may be similar or equivalent to the passage 36 in its relation to the marking device 26 (Fig. 3).

Underlying the present marking device is a method which permits the described highly advantageous marking of stock in ways different from that of the exemplary marking device 26 and associated stock-path defining provisions 36. Thus, the method contemplates flexure, against quite considerable internal resistance thereto, of a relatively short stock length against an arcuate length of the periphery of a marking roll. This is achieved by feeding the stock while under longitudinal tension in a substantially rectilinear path on one side of and at right angles to the axis of the roll and in operative alignment with the marked peripheral surface thereof, and deflecting the stock being fed from said path toward the opposite side of the roll axis at a point so closely distant from a plane which extends at right angles to said path and in which the roll axis lies that the stock length between said deflection point and plane is resiliently flexed and forced against the marked peripheral roll surface with first and second complemental forces springing from its resilient flexure and from the longitudinal tension in the stock, respectively, of which said first force is greater than said second force.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A marking device for continuous longitudinally tensioned and resiliently flexible coated wire stock, comprising means defining a substantially rectilinear path for the stock; a roll on one side of and within the longitudinal extent of said path turnable about an axis at right angles to the latter and having a peripheral surface provided with a mark operatively aligned with said path for imprinting the stock on pressure contact therewith; and means deflecting the stock from said path toward said one side thereof at a point so closely distant from a plane which extends at right angles to said path and in which said roll axis lies that the stock length between said deflection point and plane is resiliently flexed and forced against said marked peripheral roll surface with first and second complemental forces springing from its resilient flexure and from the longitudinal tension in the stock, respectively, of which said first force is greater than said second force.

2. A marking device for continuous longitudinally tensioned and resiliently flexible coated wire stock the coating of which is locally displaceable under pressure, comprising means defining a substantially rectilinear path for the stock; a roll on one side of and within the longitudinal extent of said path turnable about an axis at right angles to the latter and having a peripheral surface provided with a marked part operatively aligned with said path for imprinting adjacent stock by locally displacing coating thereof on pressure-contact therewith; and means deflecting the stock from said path toward said one side thereof at a point so closely distant from a plane which extends at right angles to said path and in which said roll axis lies that the stock length between said deflection point and plane is resiliently flexed and forced against said marked peripheral roll surface with first and second complemental forces springing from its resilient flexure and from the longitudinal tension in the stock, respectively, of which said first force is greater than said second force.

3. A marking device for continuous longitudinally tensioned and resiliently flexible coated wire stock the coating of which is locally displaceable under pressure, comprising means defining a substantially rectilinear path for the stock; a marking roll on one side and within the longitudinal extent of said path turnable about an axis at right angles to the latter and having a peripheral surface provided with a marked part operatively aligned with said path for imprinting adjacent stock by locally displacing coating thereof on pressure-contact therewith; and a rotary counter roll on the other side of said path with its axis extending parallel to that of said marking roll, said counter roll being arranged to contact with its periphery the stock at a point so close to said path and to a plane which extends at right angles to said path and in which said marking roll axis lies that the stock length between said point and plane is resiliently flexed to said one side of said path and forced against said marked peripheral roll surface with first and second complemental forces springing from its resilient flexure and from the longitudinal tension in the stock, respectively, of which said first force is greater than said second force.

4. A marking device as set forth in claim 3, in which at least one of said rolls is adjustable at right angles to its axis toward and away from said path.

5. A marking device as set forth in claim 3, in which at least one of said rolls is adjustable at right angles to its axis and parallel to said plane relative to the other roll.

6. A marking device for continuous longitudinally tensioned and resiliently flexible coated wire stock the coating of which is locally displaceable under pressure, comprising means defining a substantially rectilinear path for the stock; a first support; a marking roll on said support on one side and within the longitudinal extent of said path turnable about an axis at right angles to the latter and having a peripheral surface provided with a marked part operatively aligned with said path for imprinting adjacent stock by displacing coating thereof on pressure-contact therewith; another support; a rotary counter roll on the other side of said path with its axis extending parallel to that of said marking roll, said counter roll being carried by said other support for movement at right angles to its axis and transversely of said path; stop means on said other support engaged by said counter roll to limit movement of the latter toward said path; and spring means urging said counter roll against said stop means, said counter roll being arranged to contact with its periphery the stock at a point so close to said path and to a plane which extends at right angles to said path and in which said marking roll axis lies that the stock length between said point and plane is resiliently flexed to said one side of said path and forced against said marked peripheral roll surface with first and second complemental forces springing from its resilient flexure and from the longitudinal tension in the stock respectively, of which said first force is greater than said second force.

7. A marking device as set forth in claim 6, further comprising means for adjusting said spring means to vary its force on said counter roll.

8. A marking device as set forth in claim 6, in which said stop means is adjustable on said second support toward and away from said path.

9. The method of marking continuous resiliently flexible coated wire stock by a marked part of the peripheral surface of a rotary roll, comprising longitudinally feeding the stock while under longitudinal tension in a substantially rectilinear path on one side of and at right angles to the axis of the roll and in operative alignment with said marked peripheral surface thereof; and deflecting the stock being fed from said path toward the opposite side of the roll axis at a point so closely distant from a plane which extends at right angles to said path and in which said roll axis lies that the stock length between said deflection point and plane is resiliently flexed and forced against said marked peripheral roll surface with first and second complemental forces springing from its resilient flexure and from the longitudinal tension in the stock, respectively, of which said first force is greater than said second force.

(References on following page)

References Cited in the file of this patent

UNITED STATES PATENTS

| | | |
|---|---|---|
| 1,600,487 | Roehlen | Sept. 21, 1926 |
| 1,857,166 | Speicher | May 10, 1932 |
| 2,095,733 | Coryell | Oct. 12, 1937 |
| 2,497,386 | Zarobsky | Feb. 14, 1950 |
| 2,534,865 | Gray | Dec. 19, 1950 |
| 2,553,938 | Pierce | May 22, 1951 |
| 2,753,591 | Stevens et al. | July 10, 1956 |
| 2,815,710 | Pearson | Dec. 10, 1957 |

FOREIGN PATENTS

| | | |
|---|---|---|
| 152,876 | Australia | Aug. 18, 1953 |